(12) United States Patent
Koehler et al.

(10) Patent No.: US 8,023,636 B2
(45) Date of Patent: *Sep. 20, 2011

(54) INTERACTIVE DIALOG-BASED TRAINING METHOD

(75) Inventors: Robert Kevin Koehler, Chicago, IL (US); Gregory Scott Schatzlein, St. Charles, IL (US); Marie Jeanine Glaspie, Indianapolis, IL (US)

(73) Assignee: Sivox Partners, LLC, Eagleville, PA (US)

( * ) Notice: Subject to any disclaimer, the term of this patent is extended or adjusted under 35 U.S.C. 154(b) by 1215 days.

This patent is subject to a terminal disclaimer.

(21) Appl. No.: 11/094,250

(22) Filed: Mar. 31, 2005

(65) Prior Publication Data

US 2005/0170326 A1 Aug. 4, 2005

Related U.S. Application Data

(63) Continuation of application No. 10/078,429, filed on Feb. 21, 2002, now Pat. No. 6,914,975.

(51) Int. Cl.
*H04M 3/00* (2006.01)
*H04M 5/00* (2006.01)
(52) U.S. Cl. .............................. 379/265.05; 379/265.04
(58) Field of Classification Search ........... 379/265.04–265.06; 434/219, 434/322–323, 350, 362; 463/35, 41, 42
See application file for complete search history.

(56) References Cited

U.S. PATENT DOCUMENTS

| | | | |
|---|---|---|---|
| 4,310,727 A | 1/1982 | Lawser | |
| 4,694,483 A | 9/1987 | Cheung | |
| 4,712,180 A * | 12/1987 | Fujiyama et al. | 434/323 |
| 4,761,542 A | 8/1988 | Kubo et al. | |
| 4,922,519 A | 5/1990 | Daudelin | |
| 4,930,077 A | 5/1990 | Fan | |
| 4,964,077 A | 10/1990 | Eisen et al. | |
| 5,115,501 A | 5/1992 | Kerr | |
| 5,181,259 A | 1/1993 | Rorvig | |
| 5,204,968 A | 4/1993 | Parthasarathi | |
| 5,206,903 A | 4/1993 | Kohler et al. | |
| 5,263,167 A | 11/1993 | Conner, Jr. et al. | |
| 5,299,260 A | 3/1994 | Shaio | |

(Continued)

FOREIGN PATENT DOCUMENTS

WO 00/33548 6/2000

OTHER PUBLICATIONS

Henry Lieberman et al., "Let's Browse: A collaborative Web Browsing Agent," Jan. 5-8, 1999.

(Continued)

*Primary Examiner* — Rasha Al Aubaidi
(74) *Attorney, Agent, or Firm* — Kory D. Christensen; Stoel Rives LLP

(57) ABSTRACT

A computer readable medium stores a computer program for interactive training based on a simulated customer interaction. The computer readable medium includes a dialog code segment that provides a predetermined customer portion of a dialog segment from the simulated customer interaction to a trainee. The dialog segment includes the customer portion and at least one predetermined keyword associated with the customer portion. The computer readable medium further includes a response code segment, which receives a response to the customer portion from the trainee, and a determining code segment, which determines whether the response includes the at least one keyword.

20 Claims, 7 Drawing Sheets

U.S. PATENT DOCUMENTS

| | | |
|---|---|---|
| 5,311,422 A | 5/1994 | Loftin et al. |
| 5,323,452 A | 6/1994 | Dickman et al. |
| 5,327,529 A | 7/1994 | Fults et al. |
| 5,335,268 A | 8/1994 | Kelly, Jr. et al. |
| 5,335,269 A | 8/1994 | Steinlicht |
| 5,371,673 A | 12/1994 | Fan |
| 5,388,198 A | 2/1995 | Layman et al. |
| 5,420,975 A | 5/1995 | Blades et al. |
| 5,479,488 A | 12/1995 | Lennig et al. |
| 5,493,608 A | 2/1996 | O'Sullivan |
| 5,495,567 A | 2/1996 | Iizawa et al. |
| 5,500,795 A | 3/1996 | Powers et al. |
| 5,519,772 A | 5/1996 | Akman et al. |
| 5,530,744 A | 6/1996 | Charalambous et al. |
| 5,533,107 A | 7/1996 | Irwin et al. |
| 5,535,321 A | 7/1996 | Massaro et al. |
| 5,537,470 A | 7/1996 | Lee |
| 5,553,119 A | 9/1996 | McAllister et al. |
| 5,561,711 A | 10/1996 | Muller |
| 5,566,291 A | 10/1996 | Boulton et al. |
| 5,586,060 A | 12/1996 | Kuno et al. |
| 5,586,171 A | 12/1996 | McAllister et al. |
| 5,586,219 A | 12/1996 | Yufik |
| 5,594,791 A | 1/1997 | Szlam et al. |
| 5,600,781 A | 2/1997 | Root et al. |
| 5,615,323 A | 3/1997 | Engel et al. |
| 5,633,909 A | 5/1997 | Fitch |
| 5,657,383 A | 8/1997 | Gerber et al. |
| 5,659,724 A | 8/1997 | Borgida et al. |
| 5,668,856 A | 9/1997 | Nishimatsu et al. |
| 5,671,351 A | 9/1997 | Wild et al. |
| 5,675,707 A | 10/1997 | Gorin et al. |
| 5,684,870 A | 11/1997 | Maloney et al. |
| 5,684,872 A | 11/1997 | Flockhart et al. |
| 5,706,334 A | 1/1998 | Balk et al. |
| 5,710,884 A | 1/1998 | Dedrick |
| 5,727,950 A | 3/1998 | Cook et al. |
| 5,729,600 A | 3/1998 | Blaha et al. |
| 5,734,709 A | 3/1998 | DeWitt et al. |
| 5,740,549 A | 4/1998 | Reilly et al. |
| 5,757,644 A | 5/1998 | Jorgensen et al. |
| 5,758,257 A | 5/1998 | Herz et al. |
| 5,771,276 A | 6/1998 | Wolf |
| 5,790,117 A | 8/1998 | Halviatti et al. |
| 5,793,368 A | 8/1998 | Beer |
| 5,802,526 A | 9/1998 | Fawcett et al. |
| 5,806,060 A | 9/1998 | Borgida et al. |
| 5,808,908 A | 9/1998 | Chahramani |
| 5,809,282 A | 9/1998 | Cooper et al. |
| 5,812,975 A | 9/1998 | Komori et al. |
| 5,819,221 A | 10/1998 | Kondo et al. |
| 5,821,936 A | 10/1998 | Shaffer et al. |
| 5,822,397 A | 10/1998 | Newman |
| 5,822,744 A | 10/1998 | Kesel |
| 5,825,856 A | 10/1998 | Porter et al. |
| 5,825,869 A | 10/1998 | Brooks et al. |
| 5,832,428 A | 11/1998 | Chow et al. |
| 5,832,430 A | 11/1998 | Lleida et al. |
| 5,835,565 A | 11/1998 | Smith et al. |
| 5,848,396 A | 12/1998 | Gerace |
| 5,864,605 A | 1/1999 | Keshav |
| 5,864,844 A | 1/1999 | James et al. |
| 5,870,308 A | 2/1999 | Dangelo et al. |
| 5,872,865 A | 2/1999 | Normile et al. |
| 5,873,068 A | 2/1999 | Beaumont et al. |
| 5,884,029 A | 3/1999 | Brush, II et al. |
| 5,899,992 A | 5/1999 | Iyer et al. |
| 5,903,641 A | 5/1999 | Tonisson |
| 5,905,774 A | 5/1999 | Tatchell et al. |
| 5,920,477 A | 7/1999 | Hoffberg et al. |
| 5,923,745 A | 7/1999 | Hurd |
| 5,943,416 A | 8/1999 | Gisby |
| 5,953,406 A | 9/1999 | LaRue et al. |
| 5,963,965 A | 10/1999 | Vogel |
| 5,974,253 A | 10/1999 | Nahaboo et al. |
| 5,991,735 A | 11/1999 | Gerace |
| 5,999,611 A | 12/1999 | Tatchell et al. |
| 5,999,908 A | 12/1999 | Abelow |
| 6,014,638 A | 1/2000 | Burge et al. |
| 6,016,336 A | 1/2000 | Hanson |
| 6,026,381 A | 2/2000 | Barton, III et al. |
| 6,032,129 A | 2/2000 | Greef et al. |
| 6,035,283 A | 3/2000 | Rofrano |
| 6,035,336 A | 3/2000 | Lu et al. |
| 6,038,560 A | 3/2000 | Wical |
| 6,044,146 A | 3/2000 | Gisby et al. |
| 6,044,355 A | 3/2000 | Crockett et al. |
| 6,055,542 A | 4/2000 | Nielsen et al. |
| 6,058,163 A | 5/2000 | Pattison et al. |
| 6,058,179 A | 5/2000 | Shaffer et al. |
| 6,058,435 A | 5/2000 | Sassin et al. |
| 6,061,433 A | 5/2000 | Polcyn et al. |
| 6,067,538 A | 5/2000 | Zorba et al. |
| 6,088,429 A | 7/2000 | Garcia |
| 6,099,320 A | 8/2000 | Papadopoulos |
| 6,104,790 A | 8/2000 | Narayanaswami |
| 6,128,380 A | 10/2000 | Shaffer et al. |
| 6,134,315 A | 10/2000 | Galvin |
| 6,134,530 A | 10/2000 | Bunting et al. |
| 6,148,063 A | 11/2000 | Brennan et al. |
| 6,157,808 A | 12/2000 | Hollingsworth |
| 6,160,877 A | 12/2000 | Tatchell et al. |
| 6,163,607 A | 12/2000 | Bogart et al. |
| 6,166,732 A | 12/2000 | Mitchell et al. |
| 6,170,011 B1 | 1/2001 | Macleod Beck et al. |
| 6,173,053 B1 | 1/2001 | Bogart et al. |
| 6,173,279 B1 | 1/2001 | Levin et al. |
| 6,201,948 B1 | 3/2001 | Cook et al. |
| 6,208,970 B1 | 3/2001 | Ramanan |
| 6,212,502 B1 | 4/2001 | Ball et al. |
| 6,219,665 B1 | 4/2001 | Shiomi |
| 6,230,197 B1 | 5/2001 | Beck et al. |
| 6,236,955 B1 | 5/2001 | Summers |
| 6,236,990 B1 | 5/2001 | Geller et al. |
| 6,243,375 B1 | 6/2001 | Speicher |
| 6,249,579 B1 | 6/2001 | Bushnell |
| 6,263,052 B1 | 7/2001 | Cruze |
| 6,269,153 B1 | 7/2001 | Carpenter et al. |
| 6,278,976 B1 | 8/2001 | Kochian |
| 6,282,404 B1 | 8/2001 | Linton |
| 6,289,084 B1 | 9/2001 | Bushnell |
| 6,292,909 B1 | 9/2001 | Hare |
| 6,295,551 B1 | 9/2001 | Roberts et al. |
| 6,296,376 B1 | 10/2001 | Kondo et al. |
| 6,301,573 B1 | 10/2001 | McIllwaine et al. |
| 6,308,172 B1 | 10/2001 | Agrawal et al. |
| 6,324,282 B1 | 11/2001 | McIllwaine et al. |
| 6,330,326 B1 | 12/2001 | Whitt |
| 6,332,154 B2 | 12/2001 | Beck et al. |
| 6,336,109 B2 | 1/2002 | Howard |
| 6,349,290 B1 | 2/2002 | Horowitz et al. |
| 6,353,661 B1 | 3/2002 | Bailey, III |
| 6,353,825 B1 | 3/2002 | Ponte |
| 6,357,017 B1 | 3/2002 | Bereiter et al. |
| 6,366,879 B1 | 4/2002 | Coxhead et al. |
| 6,374,260 B1 | 4/2002 | Hoffert et al. |
| 6,389,400 B1 | 5/2002 | Bushey et al. |
| 6,389,403 B1 | 5/2002 | Dorak, Jr. et al. |
| 6,389,538 B1 | 5/2002 | Gruse et al. |
| 6,400,807 B1 | 6/2002 | Hewitt et al. |
| 6,405,149 B1 | 6/2002 | Tsai et al. |
| 6,405,159 B2 | 6/2002 | Bushey et al. |
| 6,405,170 B1 | 6/2002 | Phillips et al. |
| 6,411,687 B1 | 6/2002 | Bohacek et al. |
| 6,418,216 B1 | 7/2002 | Harrison et al. |
| 6,434,714 B1 | 8/2002 | Lewis et al. |
| 6,448,980 B1 | 9/2002 | Kumar et al. |
| 6,456,619 B1 | 9/2002 | Sassin et al. |
| 6,456,699 B1 | 9/2002 | Burg et al. |
| 6,459,787 B2 | 10/2002 | McIllwaine et al. |
| 6,483,523 B1 | 11/2002 | Feng |
| 6,487,277 B2 | 11/2002 | Beyda et al. |
| 6,516,051 B2 | 2/2003 | Sanders |
| 6,527,556 B1 | 3/2003 | Koskinen |
| 6,539,080 B1 | 3/2003 | Bruce et al. |
| 6,564,197 B2 | 5/2003 | Sahami et al. |
| 6,598,022 B2 | 7/2003 | Yuschik |

| | | | |
|---|---|---|---|
| 6,628,777 B1 | 9/2003 | McIllwaine et al. |
| 6,654,447 B1 | 11/2003 | Dewan |
| 6,658,389 B1 | 12/2003 | Alpdemir |
| 6,775,377 B2 | 8/2004 | McIllwaine et al. |
| RE38,649 E | 11/2004 | Setlur et al. |
| 2001/0014863 A1 | 8/2001 | Williams, III |
| 2001/0041562 A1 | 11/2001 | Elsey et al. |
| 2002/0009190 A1 | 1/2002 | McIllwaine et al. |
| 2002/0055868 A1 | 5/2002 | Dusevic et al. |
| 2002/0133394 A1 | 9/2002 | Bushey et al. |
| 2002/0196277 A1 | 12/2002 | Bushey et al. |
| 2003/0026409 A1 | 2/2003 | Bushey et al. |
| 2003/0048893 A1 | 3/2003 | McIllwaine et al. |
| 2003/0086555 A1 | 5/2003 | McIllwaine et al. |
| 2003/0091163 A1 | 5/2003 | Attwater et al. |
| 2003/0143981 A1 | 7/2003 | Kortum et al. |
| 2003/0156133 A1 | 8/2003 | Martin et al. |
| 2003/0158655 A1 | 8/2003 | Obradovich et al. |
| 2004/0006473 A1 | 1/2004 | Mills et al. |
| 2004/0032935 A1 | 2/2004 | Mills et al. |
| 2004/0042592 A1 | 3/2004 | Knott et al. |
| 2004/0143484 A1 | 7/2004 | Kapadia et al. |
| 2004/0165717 A1 | 8/2004 | McIllwaine et al. |
| 2004/0202308 A1 | 10/2004 | Baggenstoss et al. |
| 2004/0213400 A1 | 10/2004 | Golitsin et al. |
| 2005/0111653 A1 | 5/2005 | Joyce et al. |
| 2005/0175971 A1 | 8/2005 | McIllwaine et al. |

OTHER PUBLICATIONS

Kelly, "From Intelligent Call Routing to Intelligent Contact Management," Call Center Solutions, v19, n3, Sep. 2000, 4 pages.
"Call Center Roundup," Teleconnect, Dec. 1998, 10 pages.
"Call Centers: sales, service and competitive advantage," Canadian Business, v70, n2, Feb. 1997, 8 pages.
Foster, "Advanced Definity call centers: Working for you and your customers," AT&T Technology, v9, n2, Summer 1994, 7 pages.
Card, S.K.; Moran, T.P.; and Newell A. (1983), *The Psychology of Human-Computer Interaction*, Hillsdale, NJ: Lawrence Erlbaum.
Hart, S.G.; and Staveland, L.E. (1988), *Development of the NASA-TLX (Task Load Index): Results of Empirical and Theoretical Research*, in P.A. Hancock and N. Meshkati (Eds.), *Human Mental Workload*, (pp. 139-183) Amsterdam: North-Holland.
John, B.E.; and Kieras, D.E. (1996), Using GOMS for User Interface Design and Evaluation: Which technique? *ACM Transactions on Computer-Human Interaction*, 3 (4). 287-319.
Shingledecker, C.A. (1980), "Operator Strategy: A Neglected Variable in Workload Assessment," *The American Psychological Association, Division 21 Symposium on "Mental Workload Measurement: The Theory Application Interface,"* Montreal, Quebec, Canada: American Psychological Association.
Wei, Z.G. (1997); *Mental Load and Performance at Different Automation Levels*; The Netherlands: Delft University; Applicants particularly call the Examiner's attention to pp. 28-38 of this document.
Wierwille, W.W. and Eggemeier, F.T. (1993); Recommendations for Mental Workload Measurement in a Test and Evaluation Environment; *Human Factors*, 35 (2), 263-281.
Ameritech Corp., "Ameritech Phone-Based UI Standards: Dialogue Design," <http://www.ameritech.com/corporate/testtown/library/standard/pbix4.html>, 1998.
InterVoiceBrite, Inc., "AgentConnect Call Center Platform Brochure" (no. date available).
"ACD Learning Center Tutorial Series", ACD Call Center Online Learning Center, http://www.call-center.net/ivr-series.htm.
"Customer Management Technology", TeleTech, <http://www.teletech.com/ solutions/cmt.htm>, printed on Dec. 18, 2001.
"Products & Services—Interactive Voice Response (IVR)", Prairie Systems, http://www.prairiesys.com/PSI/p_s_interactive_sol.htm.
"RVS Voice," iMessaging Systems, Inc., <http://www.imessagingsystems.com/imsprods/rvsvoice/rvsvoice.htm>.
"What's Next in Interactive Voice Response", International Nortel Networks Meridian Users Group, <http://www.innmug.org/information/kirvan.html>, which was published in the Dec., 2000 issue of *InnTouch*.

Brooks, K.M., "Do Story Agents Use Rocking Chairs: The Theory and Implementation of One Model for Computational Narrative", Proceedings of the Fourth ACM International Multi-Media Conference on Intelligent User Interfaces, ACM Press 1996.
Murtaugh, M., "The Automatist Storytelling System: Putting the Editor's Knowledge in Software", MIT Media Lab. Master Thesis, 1996.
Maybury, M. (Intelligent Multi-Media Interfaces), AAAI/MIT Press, Cambridge, MA, 1993, Chapter 5: S.K. Feiner et al., Automating the Generation of Coordinated Multimedia Explanations.
Szekely, P., "Retrospective and Challenges for Model-Based Interface Development", USC Information Sciences Institute, Marina del Rey, CA, 1996.
Stanfill, C. et al., "Toward Memory-Based Reasoning", Communications of the ACM, vol. 29, No. 12, ACM Press, Dec., 1986.
Orwant, J., "Doppelgänger Goes to School: Machine Learning for User Modeling", MIT MS Thesis Sep. 1993.
Orwant, J., "For want of a bit the user was lost: Cheap user modeling", IBM Systems Journal, vol. 35, Nos. 3 & 4, pp. 398-416, 1996.
Shardanand, U., "Social Information Filtering for Music Recommendation", MIT MS Thesis, 1994.
From Animals to Animats 2: Proceedings of the Second International Conference on Simulation of Adaptive Behavior, Maes, P., MIT Media Laboratory 1992, Behavior Based Artificial Intelligence.
K. Kobayashi et al., "Information Presentation based on Individual User Interests," 1998 Second International Conference on Knowledge-Based Intelligent Electronic systems, Apr. 21-23, 1998, Adelaide, Australia.
N. Sgouros et al., "Dynamic Dramatization of Multimedia Story Presentations," 1997 ACM, pp. 87-94.
A. Kellner, et al., "PADIS—An Automatic Telephone Switchboard and Directory Information System," Speech Communication, Oct. 1997.
B. Carpenter, "Natural Language Call Routing: A Robust, Self-Organizing Approach," Lucent Technologies Bell Laboratories (1998).
"Lucent Technologies announces trial of natural language call routing technology for USAA," Dec. 3, 1997 (www.lucent.com/press/1297/971203.bca.html).
"Lucent Trial Natural Language Routing Technology," Dec. 3, 1997 (www.bell-labs.com/news/1997/december/3/3.html).
G. Riccardi et al., "A spoken language system for automated call routing," 1997 IEEE International Conference on Acoustics, Speech, and Signal Processing, Apr. 21-24, 1997.
Put your company in the lead. The Virtual Mentor for Customer Contact, printed from the Internet Site http://www.thedialogcoach.com/intro.html.
Mastering the skills needed for success, printed from the Internet Site http://www.thedialogcoach.com/intro_2.html.
Customize the Coach to Your Business Needs, printed from the Internet Site http://www.thedialogcoach.com/intro_3.html.
Consistent Skills, More W . . . System Features, printed from the Internet Site http://www.thedialogcoach.com/intro_4.html.
About Us, printed from the Internet Site http://www.thedialogcoach.com/aboutUs.html.
Training Camp Learn the fundamentals, printed from the Internet Site http://www.thedialogcoach.com/trngCamp.html.
Contact Training Utilizing the Job Aids, printed from the Internet Site http://www.thedialogcoach.com/conTrng.html.
Contact Training 5 modes to success, printed from the Internet Site http://www.thedialogcoach.com/conTrng2.html.
Customer Survey, printed from the Internet Site http://www.thedialogcoach.com/CustomerSurvey.asp.
Wilson, "Designing for Usability—Don't Forget the Power User" (online), Usability Interface—Oct. 1997 (retrieved from the Internet on Aug. 5, 2005), <URL: http://www.stcsig.org/usability/newsletter/9710-power-user.html >.
Cortes, "Designing a Graphical User Interface" (online), Medical Computing Today, May 1997 (retrieved from the Internet on Aug. 5, 2005), <URL: http://www.medicalcomputingtoday.com/Oagui.html >.
Vuori et al., "Chapter12: Developing of Future User Interfaces" (online), Smart Machines and Systems 2010 Technology Programme 1997-2000.

"Approach—Autonomous Agents and Automatist Storytelling", 7 pages, Jan. 5, 2000.
"ConTour", 11 pages, Jan. 5, 2000.
"Dexter", 11 pages, Jan. 5, 2000.
"Extensions—Extending the Model", 6 pages, Jan. 5, 2000.

Murtaugh, M., "The Automatist Storytelling System: Putting the Editor's Knowledge in Software," MIT Media Lab. Masters Thesis (1996).

* cited by examiner

Registration: Matrix

Register trainees for courses (Trainer, Evan)    608

Page 1 of 2

| Associate | Scenarios |  |  |  |  |
|---|---|---|---|---|---|
|  | thirty charges and greats (L)... 610 | Old charges as disposition 611 | other charges and deposition 612 | other charges as disposition 613 |  |
|  | ✏ Register All | ✏ Register All | ✏ Register All | ✏ Register All |  |
| User, Jane 621 | ☐ Registered 622 | ☐ Not Registered | ☐ Not Registered | ☐ Not Registered |  |
|  | ✗ No Practice 623 | ✗ No Practice | ✗ No Practice | ✗ No Practice |  |
| User, Kelly 624 | ☐ Registered 625 | ☐ Not Registered | ☐ Not Registered | ☐ Not Registered |  |
|  | ⚫ Can Practice 626 | ✗ No Practice | ✗ No Practice | ✗ No Practice |  |

620

- Home Page
- Registration
- Reporting
- Team
- Administration

Register Individual Associate

| | | |
|---|---|---|
| Mandatory Intervention Level 710 | 50 712 | |
| Optional Intervention Level 714 | 0 716 | |
| Forbidden Intervention Level 718 | 0 720 | |
| Software Tracking Intervention 722 | ☑ 724 | |
| Use Emulator 726 | ☑ 728 | |
| Coaching Allowed 730 | ☑ 732 | |
| Navigation Allowed 734 | ☑ 736 | |

700

INTERACTIVE DIALOG-BASED TRAINING METHOD

This application is a continuation of U.S. patent application Ser. No. 10/078,429, filed Feb. 21, 2002, now U.S. Pat. No. 6,914,975 the disclosure of which is expressly incorporated herein by reference in its entirety.

BACKGROUND OF THE INVENTION

1. Field of the Invention

The present invention relates to the field of interactive computer-based training. More particularly, the present invention relates to training call center agents at remote terminals networked to a database, based on verbal and/or textual interaction with simulated customers in dynamic scenarios.

2. Background Information

Customer service agents working in call centers are typically required to learn and internalize significant amounts of information, including various policies, procedures, products and systems, in order to competently perform their duties. In addition to the large amount of information, many modern service industries, such as the telecommunications industry, involve a high rate of change as a result of evolving technology, regulations and consumer appeal, further increasing the difficulty for the customer service agents to remain current. Moreover, customer service call centers historically suffer high turnover of personnel. The combination of these factors requires the expenditure of significant resources to continually train customer service agents to reach and maintain acceptable levels of performance.

The conventional approach to training call center agents includes providing the necessary substantive information regarding products, services, corporate policies and the like, teaching the appropriate customer communication techniques and implementing practice sessions to replicate (to the extent possible) actual conversations with customers. The typical practice sessions are conducted by trainer/instructor teams, in person. The training may include standard policies and parameters, but these are not consistently enforced or measured in an automated fashion. The consistency of training and measure of progress, from one trainee (or group of trainees) to another, is largely unknown. To simulate realistic customer interactions, many call center training operations use face-to-face role playing, which involves fellow trainees or trainers acting as customers. The interactions, as well as the accompanying feedback, are therefore inconsistent in quality and content. Such variance in training and feedback may result in disparate training results. Furthermore, statistical tracking of training results is not particularly useful because of the potential for inconsistency in the underlying training methodology.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which:

FIG. 6 is an exemplary web page of the interactive computer-based training system depicting scenario registration, according to an aspect of the present invention; and FIG. 7 is an exemplary web page of the interactive computer-based training system depicting coaching registration, according to an aspect of the present invention.

DETAILED DESCRIPTION OF EMBODIMENTS

Figure 1:
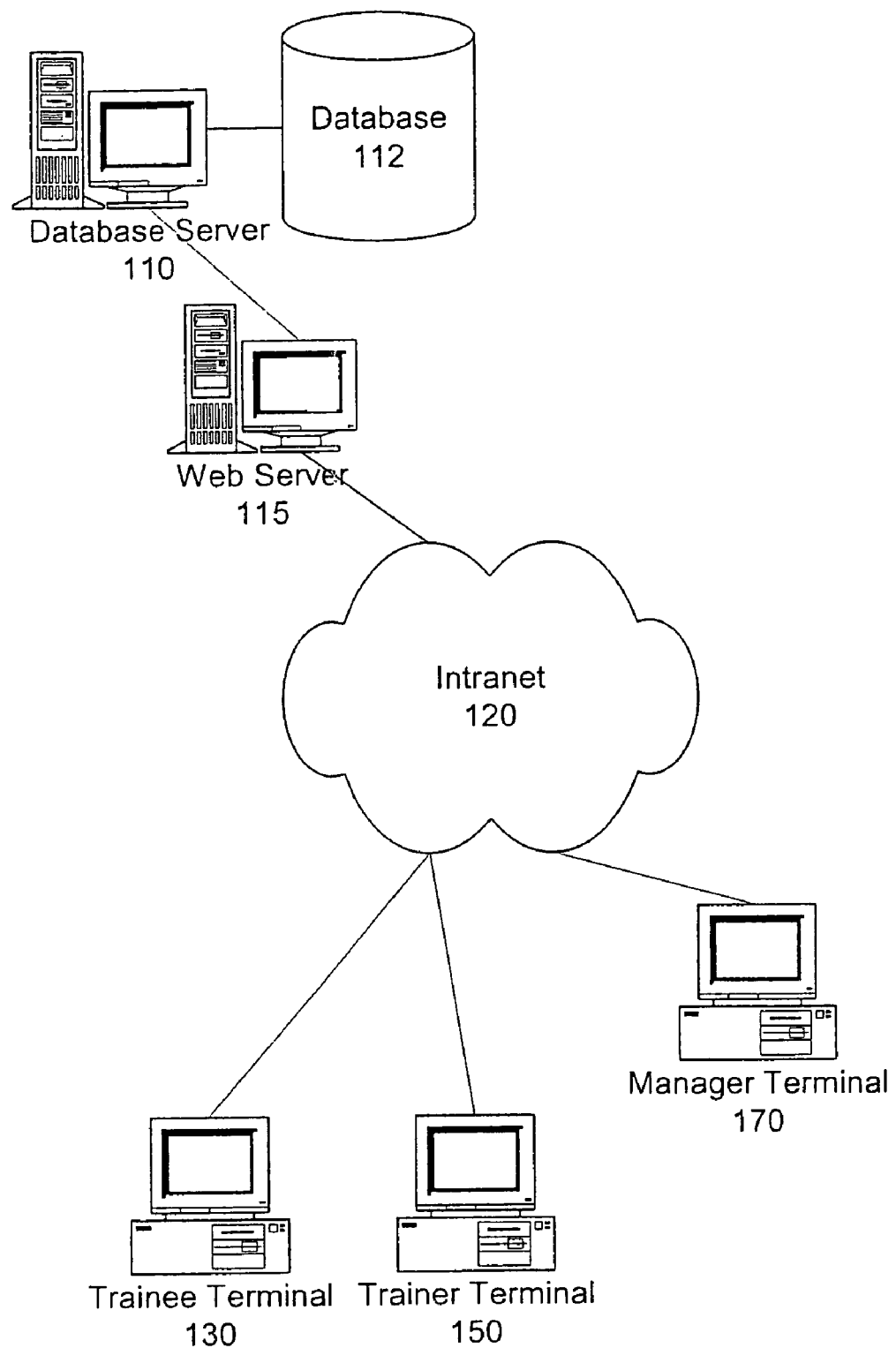
FIG. 1 is a block diagram showing an exemplary, training network capable of enabling the interactive computer-based training system, according to an aspect of the present invention.

The present invention relates to an interactive computer-based training (CBT) program directed to improving the performance of personnel interacting with the public, especially telephone-based customer service call center agents. The training program enables the trainees to practice business conversations with virtual customers in an "e-Learning" environment that provides immediate remediation for errors, depth learning for tone and style and the ability for trainers and managers to efficiently monitor progress. The training program further enables training developers to create scenarios, and trainers and managers to change scenarios for the trainees to focus the training on specific areas, for example, to address a trainee's, demonstrated weaknesses, and to implement the new or modified scenario in real-time.

The invention incorporates core CBT and web-based training (WBT) standards, integrating leading-edge voice technology to create realistic on-the-job experiences. In response to the dynamic nature of typical telecommunications environments, and the need for service representative training to keep pace, the training program delivers a customizable, interactive learning experience and can be controlled by trainers having no special level of technical skills or computer programming knowledge. Also, the voice interaction is speaker independent, such that the users do not have to "train" the system prior to participating in the training.

An objective of the training program is to improve on-job performance of call center agents. This requires standardizing trainee interactions, capturing data regarding trainee behavior relative to the objectives of specific business scenarios and measuring gaps in experience. Vocal responses are solicited from the trainees through speech recognition technology and measured for analysis. A further objective of the training program is to enable reporting, statistical analysis, and other administrative capabilities to enhance management of customer service representative training.

An aspect of the present invention provides a method for interactively training call center personnel using a computer-based system, the training including at least one call scenario involving simulated customer interactions. The call scenario includes multiple dialog segments, each of which includes a preprogrammed customer portion and at least one keyword. The dialog segments are sequentially executed by providing the customer portion of each dialog segment to a terminal of a trainee and receiving a trainee response to the customer portion of each dialog segment. It is determined whether the trainee response includes the keywords corresponding to each dialog segment. The trainee response associated with each of the dialog segments may be recorded as a sound file, which may be played in response to a request received from the trainee terminal.

When each dialog segment has been sequentially executed, a summary of the trainee's performance with respect to the call scenarios may be displayed at the trainee terminal. The summary includes the number of trainee responses that included the keywords corresponding to each dialog segment. Also, the keyword associated with a selected dialog segment may be replaced with an updated keyword, which is different from the replaced keyword. It is then determined whether the trainee response includes the updated keyword.

Another aspect of the present invention provides a method for providing computer-based, interactive call center training that includes storing at least one call scenario in a database. Each call scenario includes multiple dialog segments, which include a customer portion and at least one keyword. A selection of a call scenario is received through a trainee terminal. A customer interaction is simulated between a trainee at the trainee terminal and a simulated customer, according to the call scenario. The simulation includes sequentially executing the dialog segments by providing the customer portion of each dialog segment to the trainee through the trainee terminal and receiving a corresponding text and/or voice trainee response. The dialog segments may be sequentially executed only when the trainee response includes the at least one keyword corresponding to each dialog segment. It is determined whether the trainee response includes the at least one keyword. A selected dialog segment of the call scenario may be edited on-line, which includes adding, deleting or changing at least one of the customer portion and keywords corresponding to the dialog segment.

Another aspect of the present invention provides a method for interactively training call center personnel using an automated customer interaction between a trainee and a simulated customer. The method includes retrieving a call scenario from a database, including at least one dialog segment, and providing a customer portion of each dialog segment by displaying text or generating speech at a trainee terminal. A trainee portion of each dialog segment is received from the trainee terminal and includes at least one of text and voice entered by the trainee. It is determined whether the trainee portion of the dialog segment includes a predetermined keyword associated with the dialog segment. When the trainee portion does not include the predetermined keyword, a predetermined level of instruction is provided to the trainee relating to the dialog segment. The predetermined level of instruction is set according to a skill level of the trainee.

When the trainee portion includes the predetermined keyword, it may be determined whether the scenario includes at least a second dialog segment. When the second dialog segment exists, a customer portion of the second dialog segment is provided to the trainee terminal by at least one of displaying text and generating speech at the trainee terminal. A trainee portion of the second dialog segment is received, which is at least one of text and voice. It is then determined whether the trainee portion of the second dialog segment includes a second predetermined keyword associated with the second dialog segment. When the trainee portion does not include the second predetermined keyword, the predetermined level of instruction is provided to the trainee relating to the second dialog segment.

With respect to setting the predetermined level of instruction, the skill level of the trainee may be determined automatically based on the number of times the trainee has performed the call scenario. Also, the skill level of the trainee may be determined based on input by a trainer setting the skill level with respect to the trainee and the call scenario. Determining the skill level may occur during the interaction between the trainee and the simulated customer.

The results of the interaction between the trainee and the simulated customer may be stored in a database. The results include an indication of whether the trainee portion of the dialog included the predetermined keyword and an indication of the level of instruction provided to the trainee, if any. The results of the interaction between the trainee and the simulated customer may be compared with results of at least a second interaction between a second trainee and the simulated customer. A report is generated analyzing the comparison.

Another aspect of the present invention provides a computer readable medium for storing a computer program that interactively trains call center personnel. The computer readable medium includes a memory segment that stores at least one call scenario, including multiple dialog segments, and a training source code segment that enables selection of a call scenario. Each dialog segment includes a customer portion and at least one keyword. The computer readable medium further includes a simulator source code segment, which simulates an interaction between a trainee and a simulated customer according to the call scenario, and an administration source code segment, which enables administrative functions with respect to the computer program. The simulator source code segment includes a business rules source code segment that sequentially executes the dialog segments by providing the customer portion corresponding to each dialog segment to the trainee and receiving a corresponding trainee response. The trainee response is text and/or voice entered by the trainee. The administration source code segment includes a call scenario editor source code segment that enables an addition, deletion and/or edit of the call scenario.

The simulator source code segment may further include a coach source code segment that determines whether the trainee portion of each dialog segment includes the at least one keyword corresponding to each dialog segment. The business rules source code segment sequentially executes another dialog segment when the keyword is included. The coach source code segment provides a predetermined level of instruction to the trainee when the keyword is not included.

The administration source code segment may further include a reporter source code segment that generates a progress report of the trainee. The progress report includes a performance assessment based on the trainee including the keywords in the trainee responses corresponding to the dialog segments and a comparison of statistical data stored in the memory segment. The simulator source code segment may further include a software emulation source code segment that provides an emulation of actual call center software to the trainee through a graphical user interface (GUI). The simulator source code segment may also include a voice playback source code segment that records the voice entered trainee portion corresponding to each dialog segment and replays the recorded trainee portion upon instruction received from a GUI.

Yet another aspect of the present invention provides a computer readable medium for storing a computer program that interactively trains call center personnel using an automated customer interaction between a trainee and a simulated customer. The computer readable medium includes a retrieving source code segment, a simulator source code segment and a coaching source code segment. The retrieving source code segment retrieves a call scenario from a memory, the call scenario including at least one dialog segment. The simulator source code segment executes the dialog segments by providing a customer portion of each dialog segment to a trainee at a trainee terminal and receiving a trainee portion of the dialog segment. The coaching source code segment determines whether the trainee portion of the dialog segment includes a predetermined keyword associated with the dialog segment. The coaching source code segment also provides a predetermined level of instruction to the trainee relating to the dialog segment when the trainee portion does not include the predetermined keyword. The predetermined level of instruction is set according to a skill level of the trainee.

Furthermore, the simulator source code segment may determine whether the scenario includes at least a second dialog segment when the trainee portion includes the predetermined keyword. When a second dialog segment exists, the simulator source code segment provides a customer portion of the second dialog segment to the trainee at the trainee terminal and receives a trainee portion of the second dialog segment. The coaching source code segment then determines whether the trainee portion of the second dialog segment includes a second predetermined keyword associated with the second dialog segment. When the trainee portion of the second dialog segment does not include the second predetermined keyword, the coaching source code segment provides the predetermined level of instruction to the trainee relating to the second dialog segment.

The coaching source code segment may determine the skill level of the trainee automatically based on a number of times the trainee has performed the call scenario. The coaching source code segment may determine the skill level of the trainee based on an input by a trainer setting the skill level with respect to the trainee and the call scenario. Determining the skill level may occur during the interaction between the trainee and the simulated customer.

The computer readable medium may further include a storing source code segment that stores results of the interaction between the trainee and the simulated customer in the memory. The results include an indication of whether the trainee portion of the dialog segment included the predetermined keyword and an indication of the level of instruction provided to the trainee, if any. Also, the computer readable medium may include a comparing source code segment and a reporting source code segment. The comparing source code segment compares the results of the interaction between the trainee and the simulated customer with results of at least a second interaction between a second trainee and the simulated customer. The reporting source code segment generates a report analyzing the comparison.

FIG. 1 is a block diagram depicting an exemplary data network enabling the present invention. The network is modular, which enhances flexibility to incorporate emerging technologies, such as advances in voice recognition and simulation, without having to redesign or replace the entire network. The exemplary network of FIG. 1 includes a database 112, an associated database server 110 and a web server 115, accessible through a packet switched data network, such as intranet 120. In an alternative embodiment, the database server 110, the database 112 and the web server 115 are accessible via secure connections through the Internet using, for example, secure sockets layer (SSL) protocol, developed by Netscape Communications.

The web server 115 may be an Internet Information Server (IIS), developed by Microsoft Corporation, for example, running Microsoft IIS 4.0 software. The database 112 may be a standard relational database, for example, serviced by the database server 110, such as a Microsoft structured query language (SQL) server 7.0 running Microsoft-SQL server 7.0 software. In an embodiment of the invention; the database 112 has self-administering tools and collects and stores data in tables. Each table represents a class of objects representing features of the invention, such as scenarios, dialog segments and keywords, as discussed below. The application database 112 may be accessible by Microsoft's open database connectivity (ODBC) and object linking and embedding database (OLE DB) interfaces. Of course, any compatible databases and servers having sufficient capability to implement the invention may be incorporated.

The training program involves three categories of users: (i) trainees, (ii) trainers and (iii) managers. In an embodiment of the invention, each of the user categories accesses the training program from a remote computer terminal or GUI, e.g., the trainee terminal 130, the trainer terminal 150 and the manager terminal 170, networked with the web server 115 and the database 112 through the intranet 120. The remote computer terminals may be, for example, IBM Pentium based personal computers (PCs), running the Microsoft Windows 98 or Windows NT operating systems, with standard sound cards and Microsoft Visual Basic 6.0. Each PC further includes a web browser, such as Microsoft Internet Explorer or Netscape Navigator, available from Netscape Communications Corporation. Alternative embodiments of the invention include any number and combination of trainee, trainer and manager terminals connectable to the intranet 120, including, for example, users from all three categories accessing the training program from a single terminal or any user category having multiple terminals configured to access the training program simultaneously.

The trainees interact with the training program from the trainee terminal 130 by voice or text in order to train and practice call simulations. The voice interaction is enabled by a headset with a microphone, such as a Plantronics Model LS1 stereo PC headset, connected to the trainee terminal 130. The trainee responds to simulated customer input by speaking into the microphone or typing on a keyboard connected to the computer terminal.

The trainers and managers communicate with the training program primarily by text interaction from the trainer terminal 150 and the manager terminal 170, respectively. The trainers manage the training simulations, coach the trainees and report on the various scenarios. The trainers are able to alter scenarios to particularly address areas of weakness demonstrated by a trainee. Altering the scenarios may be performed in real-time, when desired by the trainer. The trainers are also able to adjust the level of automated feedback available to the trainees, also known as coaching.

The managers maintain the training program, create and control simulations, and manage access to the training program. Depending on the implementation of the training program, the managers may be divided into administrators and developers. The administrators perform purely administrative functions, such as maintaining the training program and data, controlling access to the system, generating and analyzing reports, and monitoring the overall performance of the program, as well as the trainees. The specific functionality of each administrative function is discussed in detail, below. The developers, who may also be administrators, focus on the content of the training program, which includes writing and updating scenarios, as well as the scope and substance of the automated feedback. Like the trainers, the developers are able to alter scenarios to address areas of importance or concern for the training program to particularly address.

The interactive training program software is modular. In other words, the training content is segmented among various call scenarios, along with the supporting knowledge and skill bases. The modular nature of the training program has several advantages. For example, the training scenarios may be assembled to fit specific short-term and long-term training targets. Also, in the event of a change in content, such as a change in policy or technology of the calling center for which the trainees are training, the affected scenarios may be easily isolated and modified, as needed. The modular design is scalable and flexible, allowing parallel development of the various modules, as well as customization and iteration of the overlying interfaces, without affecting the underlying training program logic. The modular design enables the training program to efficiently adjust to business needs caused by rapid and dramatic changes within the relevant industry.

Figure 2:
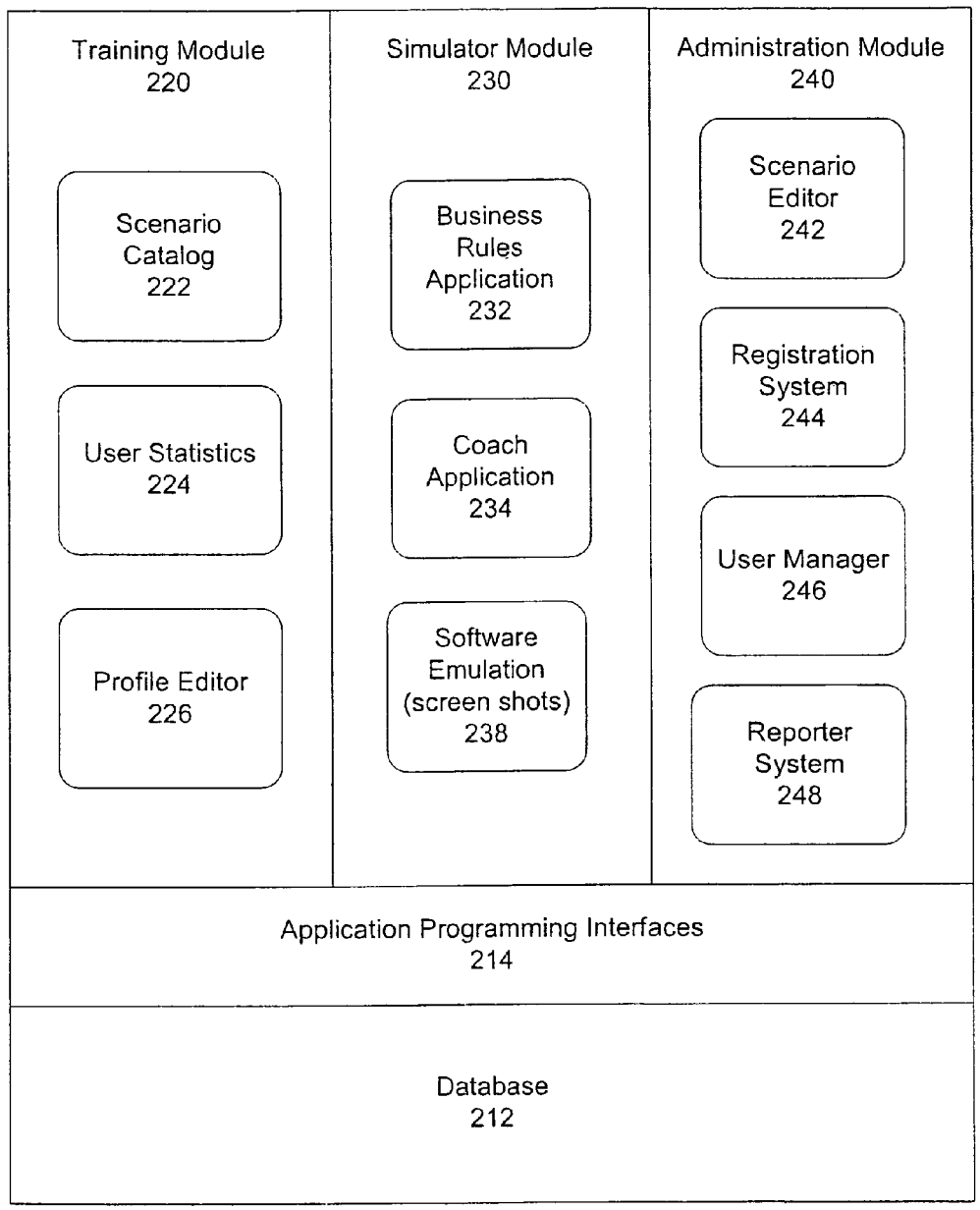
FIG. 2 is a block diagram showing exemplary data and applications for implementing the interactive computer-based training system, according to an aspect of the present invention.

In an embodiment of the invention, the interactive training program includes four basic modules, each including various applications and/or dynamic data, as depicted in the block diagram of FIG. 2. The modules include the database 212, the training module 220, the simulator module 230 and the administration module 240, each of which includes multiple applications related to the various features of the present invention. The database 212 is accessible to the other modules through an interface, e.g., application programming interfaces (APIs) 214, enabling the applications access to the associated data. The APIs provide consistent, yet flexible interfaces that enable changes or additions to be made within one module without requiring corresponding changes in the database 112 or the other modules. In an embodiment of the invention, the applications are correlated with objects implemented in object oriented programming.

The processing of the training program may be centralized, such that each module is stored and implemented by a central server or other processing unit. Alternatively, the training program may be distributed across a combination of integrated processors. For example, the database 212 may be located in a centralized database, such as the database 112 of FIG. 1, accessible by numerous users over a broad geographic area through a packet switched data network, such as the intranet 120. The training module 220 and the administration module 240 may be web based applications. The engine that drives the training module 220 and/or the administration module 240 may reside on the database server 110 or the web server 115, having logic implemented, using Java or JavaScript. The simulator module 230 may be a client based application executed, for example, by the trainee terminal 130. Regardless of the distribution of the processing, the functionality of the database 212 and each application module remains essentially the same.

The database 212 interfaces with all modules of the training program in order to drive the respective application with dynamic data. The data stored in the database 212 includes the various scenarios created to provide the trainee with a realistic, yet controlled interaction with a simulated caller. Each scenario includes a series of dialog segments, which are the sets of customer lines or inputs, and the corresponding trainee responses. The dialog segments are designed to represent categorical customer inputs that a call center agent would expect to hear on the job at an actual call center. For example, a scenario may be designed around a sophisticated customer, an angry customer, a non-communicative customer, a confused customer, a new customer and the like.

Each dialog segment includes a set of keywords. The keywords are the words determined by the trainers and/or managers to be critical to the customer interaction and must be spoken by the trainee in order to progress within the scenario, as determined by the call flow business rules 232 and the coach application 234, discussed below. In an embodiment of the invention, the keywords are classified into multiple levels, such as mandatory words, which must be spoken (or typed) and are crucial to acceptable performance under the training scenario; forbidden words, which cannot be used by the trainee under the circumstances of the scenario; and optional words, which are recognized alternatives to the mandatory words, but are scored separately. Each type of keyword also has respective aliases, which are essentially synonyms of keywords. For example, aliases of the mandatory keywords may be identified at the time a scenario is created and stored along with the associated mandatory keywords in the database 212. The aliases are interchangeable with the mandatory keywords from a scoring perspective. Also, because of the flexibility of the training program, the trainers may add aliases words through the scenario editor 242 of the administration module 240, discussed below, at any time. For example, when it becomes apparent that another word is used frequently and is just as effective as the associated mandatory keyword, the trainer may decide to include the alternative word as an acceptable alias.

The keywords may be required for each dialog segment of the scenario or, more generally, for the overall scenario. In other words, depending on the design of the training program, the trainee may receive credit for including keywords in the conversation when the keyword is said during a particular dialog segment in which the use (or non-use) of the keyword is determined to be most critical. In a less stringent version, the trainee may receive credit for keywords used anytime during the scenario. The keywords also include criteria levels, which enable the simulator module 230 to identify the success level of each spoken dialog. The managers may classify the importance levels of each keyword while building the scenarios. The importance levels may likewise be updated through the scenario editor 242.

The simulator module 230 simulates a typical telephone call to a customer service call center to solicit responses from the trainee. The simulator module 230 contains the training logic and controls the GUI that the trainee uses to practice a simulation. The simulator module 230 may be a client-server application, for example, residing on the individual workstations, such as the trainee terminal 130. The trainee initiates the simulator module 230 from the training module 220, which may be web-based, by selecting a particular training scenario. In response, the simulator module 230 loads simulation information from the database 212, including keywords, dialog segments and sound files.

The simulator module 230 creates a realistic training environment in two respects. First, through the business rules application 232, the simulator module 230 initiates a real-time, spoken conversation with the trainee at a GUI, e.g., trainee terminal 130, incorporating the pre-established dialog segments from the selected scenario. Second, the software emulation 238 of the simulator module 230 is programmed to mimic the software actually running a customer service center for which the trainee is training. For example, the screenshots, caller data format, options, keyboard configuration and the like are identical to that of the actual call center, so the trainee is trained on system operation at the same time the trainee is learning to communicate with customers.

The business rules application 232 also identifies data to be loaded from and stored to the database 212, as well as starts and stops a voice recognizer, which may be client-based on the trainee terminal 130, for example, and which is integrated with the simulator module 230. The voice recognizer listens to human speech and extracts keywords provided by the business rules application 232. When appropriate, according to the pre-established rules governing the training session, a computerized coach application 234 is activated to assess the trainee's actions and voice responses based on the keywords associated with the dialog segments, which are uploaded to the simulator module 230 from the database 212, in an embodiment of the invention. Upon completion of the selected scenario, the business rules application 232 also determines and displays the performance statistics or score at the trainee terminal 130, enabling immediate self-assessment by the trainee.

The coach application 234 is a virtual instructor. It receives the trainee's statements by way of the voice recognizer and provides measured feedback, such as hints, tips, learning units and other assistance based on the trainee's success relative to the selected level of coaching. The coach application 234 monitors the trainee's performance based on keywords, evaluates the use of each keyword and provides feedback to the trainee regarding the level of performance at the end of each dialog segment or scenario. The coach application 234 also provides the trainee the opportunity to type responses to computer generated customer input, in the event the trainee feels (or the business rules application 232 determines) that the voice recognition was inaccurate. When performance is unacceptable, the coach application 234 may provide feedback and require the trainee to repeat the particular dialog, as discussed below. Furthermore, in an embodiment of the invention, the coach application 234 may enable performance support tools external to the training program. For example, the coach application 234 may hyperlink to another training system or data feed more specifically directed to a shortcoming repeatedly demonstrated by the trainee.

The simulator module 230 also includes software emulation 238 that includes interactive screen shots designed to represent actual call center desktop software. Because different companies, or different regions within the same company, may vary with respect to call center design and implementation, the software emulation 238 may include multiple screen shot emulations representing the software of the respective regional call centers. The software emulation 238 may reside in a regional database, for example. The software emulation 238 duplicates regional software behavior to the degree required by a particular call simulation or training goal, and thus provides functionality needed to complete the scenario in a realistic manner suitable to the performance and learning need.

In an embodiment of the invention, the software emulation 238 is enabled by corresponding, region-specific data, which may likewise be stored in a regional database and updated through a network (e.g., intranet 120) interface, enabling efficient modification. For example, when a region changes an offered product or service, the call service representatives must be retrained. Data describing the new product or service is stored in the regional database, replacing data describing the old product or service. The software emulation 238 for the affected region may then proceed as always, drawing on the newly stored regional data, as represented in simulated screens mimicking the new desktop application supporting the new product.

The regional database may also include customer data, which likewise populates the software emulation 238, so that the trainee receives "pop-up" caller data during simulated calls, as would be the case in an actual call center interaction. The customer data includes, for example, the customer name, address, account balance, current product/service information and the like. The customer data may also be updated by a web interface.

The various users interact with the training system by way of the training module 220. For example, the trainees access the training portion of the training program through the training module 220, while the trainers and managers likewise interface with both the training portion of the training program and the administration module 240 through the training module 220. For the trainee, the training module 220 displays a home page on a GUI, such as the trainee terminal 130, enabling the trainee to login, customize the interface, view and select authorized training scenarios, and the like. The training module 220 includes, for example, a scenario catalog 222, a user statistics application 224 and a profile editor 226, discussed below.

Figure 3:
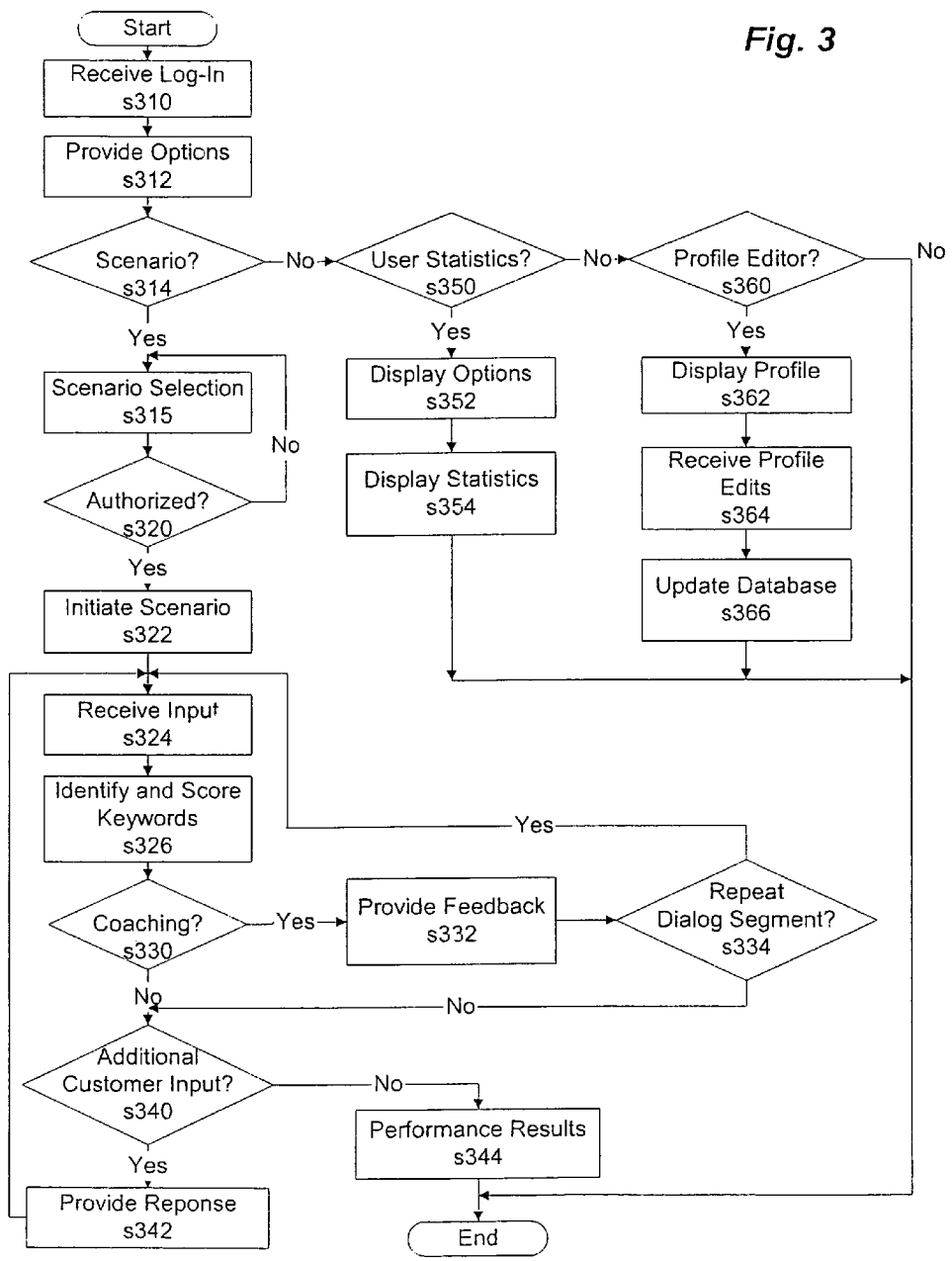
FIG. 3 is a flowchart depicting an exemplary interaction with a trainee using the interactive computer-based training system, according to an aspect of the present invention.

A trainee enters the training program by logging onto the system from a home page displayed at the trainee terminal 130 at step s310 of FIG. 3. The log-in process is enabled by pre-assigned identification data specific to the trainee, such as an account number (or user name) and a password. The account number and password are determined by the manager and assigned to the trainee at the beginning of the training process. Data specific to the particular trainee, may also be stored in association with the account number, such as the experience level of the trainee (e.g., new training, refresher course, continuing education on new systems, etc.). The log-in is performed in response to a typical introductory screen and is entered through the terminal keyboard or, in an alternative embodiment, through voice commands. The training system authenticates the user by retrieving the account number and password from the corresponding file in the database 212 and determining the validity of the same, as well as determining and implementing any restrictions to system access that may be associated with the trainee.

After allowing the trainee to log-in, the simulator module 230 causes options to be provided to the training terminal 130 at step s312. The options may be provided textually or audibly. The options include viewing scenarios, statistics or profile data, changing the log-in data associated with the account number, and logging out. As shown in FIG. 2, the scenarios are viewed (and ultimately executed) by way of a scenario catalog 222, which may include scenario catalogs directed to the specific trainee or to the class or region to which the trainee belongs. Viewing statistical data is enabled, through a user statistics application 224 and viewing (and editing) profiles is enabled through a profile editor 226. The initial log-in screenshot may include additional information relating to the trainee, such as the trainee's name, the associated trainer's name, the number of scenarios the trainee completed, the number of scenarios for which the trainee is registered and the like.

When the trainee elects to view the scenarios at step s314, a list of scenarios is displayed on the screen of the trainee terminal 130. The scenarios include practice scenarios, which may be performed by the trainee at will to hone skills without affecting the trainee's overall score. Performance of the practice scenarios may be limited, depending on the parameters established by the trainers or managers. Similarly, the trainee may select a registered scenario, the availability of which is predetermined by the trainers or managers. Unlike the practice scenarios, the results of the registered scenarios are stored for performance evaluation. The scenario display may include the name and a brief description of the scenario, together with an indication of whether the scenario is a practice scenario or a registered scenario. To select a training scenario, the user clicks on the designated portion of the display, such as specific text or an icon, representing the desired scenario, which activates the simulator module 230.

In an embodiment of the invention, the trainee accesses a catalog of scenarios from the scenario catalog 222 and specifically requests permission to enter and execute scenarios the trainee deems helpful. An example scenario catalog 222 is depicted in box 410 of web: page 400 shown in FIG. 4. Each scenario may include parenthetical information to guide the trainee, such as a description of its purpose or the state or service to which the scenario applies.

At step s315, the scenario selection is received from the trainee terminal 130 and authorized at step s320. As stated above, the trainers and/or managers authorize the practice and registered scenarios that a trainee (or group of trainees) is permitted to execute. The access information is created and updated through the registration system 244 and stored in the database 212. In an embodiment of the invention, only the scenarios for which a trainee is pre-approved are displayed to the trainee in response to step s314, eliminating the need for authorization at step s320.

When the selected scenario is authorized, the simulator module 230 initiates the scenario at step s322. In an embodiment of the invention, the data relating to the scenario, including the audio files and/or voice generation files for customer simulation, are uploaded from the database 212 to the simulator 230. The relevant dialog segments may then be stored on a local hard drive, for example, of the trainee terminal 130, or alternatively in some other virtual digital resource.

With respect to the voice interaction, the trainee receives prerecorded audio files or, alternatively, audio signals from a voice simulator interfaced with the database 212, which simulate a conversation from the customer's perspective. For example, extended mark-up language (XML) strings of text may be received via a voice simulator API in the APIs 214 using hypertext transfer language protocol (HTTP). In an embodiment of the invention, the voice simulator is based on RealSpeak for Windows text-to-speech software, developed by Lernout & Hauspie Speech Products USA, Inc., which is capable of providing about 16 hours of speech for every one hour of system operation.

The received data specifies a phrase to be spoken by the computer, a unique identification number associated with the phrase and various control parameters, such as speech rate and volume. Upon receipt of the text data, the voice simulator. API responds by acknowledging the request and storing the phrase in a processing queue table. At pre-determined time intervals, a voice simulator operating with the simulator module 230 checks the processing queue table for new entries. When a new entry is identified, the voice simulator sends the phrase to a text-to-speech application to transform the text data into audio files, which are stored, for example, in .WAV format, developed by Microsoft and IBM, or MP3 format. The audio files may be stored at the web sever 115 and thus retrievable by a universal resource locator (URL) or universal naming convention (UNC) path.

Each audio file is assigned a unique name based on a dialog segment identification in a dialog table. Once the audio file is processed, either successfully or unsuccessfully, the status code of the dialog table is updated. The status code, together with the file name, is provided to the scenario editor 242 in order to show the trainers or managers which audio files have been completed. The voice simulator API may enable deletion of selected audio files, as well as responses to requests for default values and available parameter values. More than one voice simulator may be implemented, depending on the system capacity to deliver the desired number of hours of speech in one hour.

In an embodiment of the invention, sound files may be generated using sources other than the voice simulator. For example, actual voice recordings may be made and stored as .WAV or MP3 files. Like the generated voice files, each sound file is assigned a name and location and stored in the web server 115. The stored voice strings and associated file names and locations are passed to the simulator module 230 for implementation.

In response to the scenario initiation, the business rules application 232 receives input from the trainee at step s324. The trainee's input includes speaking into the headset microphone or, alternatively, typing on a keyboard interfaced with the trainee terminal 130. Note that the initial dialog segment of the scenario includes an incoming customer call and the trainee's response, e.g., answering the call and greeting the customer. For example, the software emulation 238 may provide an indication of a queued call that mimics the same indication received by an agent at the actual call center, such as a beeping call initiation sound, indicating that the scenario is ready. The trainee receives the call (e.g., by a particular keystroke, as provided by the software emulation 238) and responds with a greeting.

Figure 4:
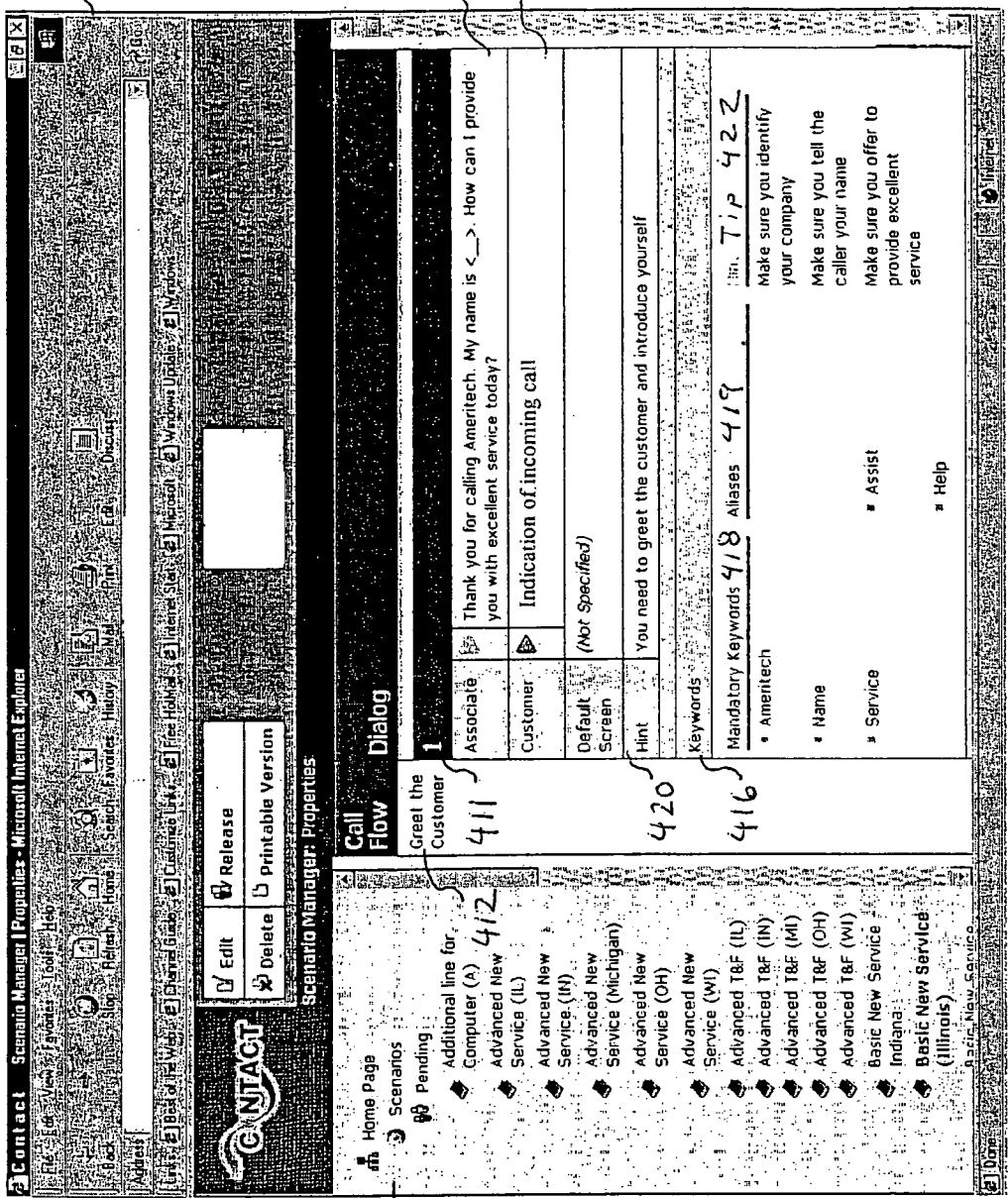
FIG. 4 is an exemplary web page of the interactive computer-based training system depicting a dialog segment of a scenario, according to an aspect of the present invention.

In an embodiment of the invention, the current dialog segment is displayed on the screen contemporaneously with execution of the trainee's portion of the dialog segment. For example, in the web page 400 of FIG. 4, the dialog counter 411 indicates "1," i.e., the first dialog segment. A short description of the dialog segment number 1 is indicated in the call flow block 412 as "greet the customer." The entire dialog segment is captured as a customer statement 413 followed by the trainee response 414. Because FIG. 4 depicts the initial trainee interaction, the customer statement 413 merely states "indication of incoming call," eliciting the trainee response 414: "Thank you for calling Ameritech. My name is Adam. How can I provide you with excellent service today?"

The voice recognizer integrated with the simulator module 230 receives the trainee's voice input. In an embodiment of the invention, the voice recognizer is implemented as a Microsoft ActiveX control compatible with Microsoft Visual Basic, Version 6.0, as a component object model layer on top of ASR 1600 software, for example, developed by Lernout & Hauspie. Furthermore, the voice recognizer is preferably speaker independent. In other words, it does not need to be "trained" based on each individual user's voice. The voice recognizer listens to human speech captured, for example, at the trainee terminal 130 by a headset microphone.

The spoken responses are converted into text by the voice recognizer, which text is compared through the coach application 234 to the pre-established keywords retrieved from the database 212 relating to the current dialog segment at step s326. The original keywords are received, for example, via a keyword API over HTTP having XML format. At step s330, the coach application 234 determines whether coaching is to be provided to the trainee. As stated above, the coach application 234 is programmed to provide hints, tips and learning units in direct correlation with the trainee's performance, and displays the performance statistics or score at the trainee terminal 130. The determination of the coach application 234 is two-fold. The coach application 234 determines the trainee's performance results (e.g., the number of keywords successfully included, or not included, in the trainee's input), and whether the performance results warrant coaching (remediation) in view of the intervention level set, for example, by the trainers.

The intervention level is the threshold that governs the amount of coaching to be provided to a particular trainee or class of trainees. A new trainee may warrant a high level of coaching, while a trainee nearing the end of the training program may warrant little to no coaching. For example, when the intervention level of coaching is set to fifty percent, the coach application 234 interrupts the scenario between dialogs and provides guidance whenever the trainee fails to match half of the required keywords. Similarly, an intervention level of zero percent means that the coach application 234 does not interrupt the scenario at all, regardless of the trainee's performance. The intervention level is set by the trainer through the administration module 240. However, in an embodiment of the invention, the trainer may adjust the intervention level through the training module 220 for individual trainees at their terminals.

When the coach application 234 determines that coaching is required, it provides substantive feedback at step s332. The content of the substantive feedback may likewise be set to correspond to the significance of the errors or the skill of the trainee, prior to or during the training session. In particular, the coach application 234 may be programmed to provide a hint whenever the trainee omits a keyword while responding to the call initiation or the customer input of the current dialog segment. For example, as shown in the hint block 420 of FIG. 4, when the trainee neglects to include his or her name in the greeting, the coach application 234 provides a hint relevant to the omission without actually giving the answer, e.g., "You need to greet the customer and introduce yourself."

Similarly, the coach application 234 may provide a tip based on additional predetermined criteria, such as when the trainee has repeated a mistake. The coach application 234 may be programmed to provide tips based on other criteria, as well, such as inexperience of the trainee or participation in a practice scenario (as opposed to a registered scenario). A tip is more definitive than a hint and provides limited substantive guidance. The tip block 422 of FIG. 4 provides such additional guidance to the trainee, e.g., "Make sure you identify your company; make sure you tell the caller your name; make sure you offer to provide excellent service."

The coach application 234 may also provide the actual keyword for which it was looking in the dialog segment, as indicated for example in the keyword block 416 of FIG. 4. In an embodiment of the invention, the keyword block 416 includes mandatory keywords 418 and associated aliases 419 to further assist the trainee. As discussed above, aliases are determined by the trainers and/or managers prior to scenario execution in order to provide the trainee controlled flexibility. For example, the keyword block 416 informs the trainee that "assist" and "help" are acceptable substitutes for the keyword "service." The trainers and/or managers create and implement the aliases through the scenario editor 242. Due to the ease with which the scenarios are edited, a trainer may add aliases via the scenario editor 242 and reissue the scenario for use, when the trainer determines that particular words are being used repeatedly and appear to be equally acceptable in the context of the scenario.

The highest substantive coaching level is provided in the form of learning units. Learning units are displayed to the trainee whenever more significant or repetitive errors occur during a dialog segment or scenario. They provide more than simply identifying a particular omission or mistake. Learning units are actual lessons, providing background and explanation regarding the subject matter with which the trainee is having difficulty. For example, the learning units may provide actual course materials to facilitate further learning by the trainee. In an embodiment of the invention, the learning units include prerecorded video files that enhance the trainee's learning experience by visual explanation and/or demonstration.

At step s334, the coach application 234, in conjunction with the business rules application 232, determines whether the dialog segment that has resulted in feedback to the trainee should be repeated. In an embodiment of the invention, whether to repeat a dialog segment is based on the type of substantive feedback provided. For example, when the training program provides a hint to the trainee, repeating the scenario is necessary so that the trainee has an opportunity to correct an error with minimal coaching intervention. Providing a learning unit, however, results in the trainee proceeding to the next dialogue segment because it is likely the trainee will be required to repeat the entire scenario, regardless. Alternatively, though, the dialog segment may be repeated following a learning unit in order to underscore the subject matter in the practical application. When the dialog segment is repeated, the training program returns to step s324 to receive the trainee's input. When the segment is not to be repeated, the training program advances to step s340.

In another embodiment of the invention, the trainee is able to navigate through each scenario, repeating the various dialog segments as desired. The trainee may navigate, or be barred from navigating, depending on how the trainer sets up the parameters of the scenario. The trainer or manager enables the navigation ability from the registration system 244, discussed below. The trainee may then determine the problematic dialog segments, in conjunction with the automated coaching, and repeat the dialog segments at will. The trainee would not be able to navigate within registered scenarios, which are scored for performance evaluation and therefore must be standardized among the trainees.

At step s340, the business rules application 232 determines whether the simulated call includes another customer line in the scenario script. When there are no further customer lines, the business rules application 232 determines that the scenario has ended. The trainee's performance results are then displayed on the trainee terminal 130, at step s344, for the trainee to assess his or her own performance. The display of performance results may operate independently from the coaching function. For example, when a trainee's coaching level is set to zero, the trainee receives no coaching during the scenario, but still receives performance results upon completion of the scenario.

The performance results include, for example, an overall score, the number of keywords in the scenario, the number of keywords successfully included by the trainee, identification of strengths and weaknesses, and the like. The performance results may further include statistical analysis, such as comparisons of the trainee's scenario performance against industry training standards, company-wide or region-wide training standards, other trainees and the like, which requires access to additional information stored in the database 212.

Figure 5:
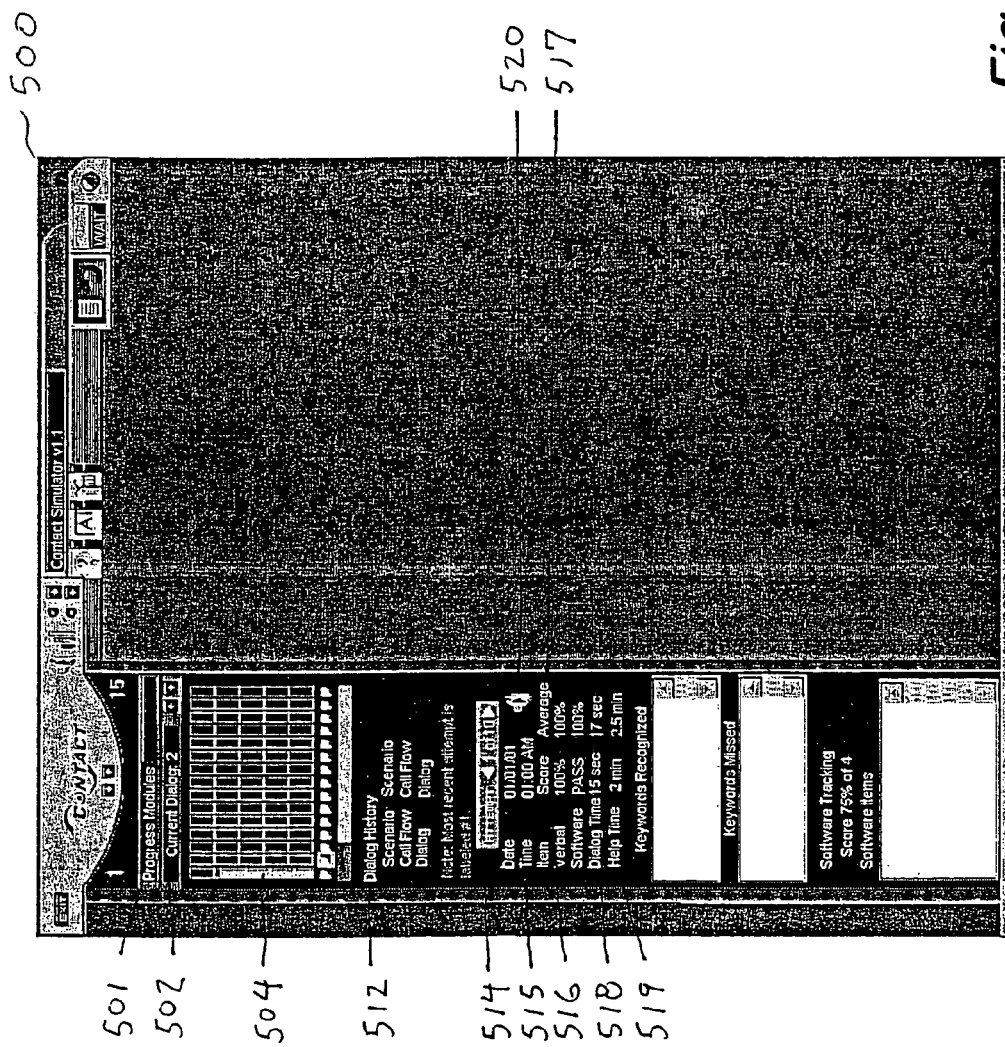
FIG. 5 is an exemplary web page of the interactive computer-based training system depicting trainee performance results, according to an aspect of the present invention.

In addition to the summary performance results displayed at step s344, the trainee's performance progress may be tracked on the client side and displayed during execution of the scenario, e.g., between dialog segments before being uploaded to the web-based scoring application, in an embodiment of the invention. As shown in exemplary web page 500 of FIG. 5, a performance progress block 501 is displayed along the left side of the trainee's screen throughout the scenario interaction. A dialog table 502 indicates the number of keywords recognized in each dialog segment. The dialog table 502 includes a vertical progress bar 504 showing the number of keywords per dialog segment recognized by the voice recognizer and coach application 234. The exemplary dialog table 502 provides for five keywords per dialog segment. For a perfect scenario score, the progress bar 504 for each of the dialog segments extends vertically through all five keyword indicators.

Below the dialog table 502 is a dialog segment overview section 512, which includes a dialog segment identifier 514 and corresponding dialog segment data. The dialog segment identifier 514 indicates that the current dialog segment is the first of 10 dialog segments that comprise the scenario. The dialog segment data includes the date and time 515 of the dialog segment, the score 516, the comparable average 517 of all trainees, the elapsed time 518 used to execute the dialog segment and the total coaching time 519 provided to the trainee. Additional alternative embodiments may include any data that the trainers and/or managers deem appropriate for display during the scenario.

Also, the trainee may hear his or her spoken response to a customer's portion of the displayed dialog segment by clicking on the speaker icon 520. The recording enables the trainee to hear the actual verbal reply, including tone, volume, inflection and other basic communication factors critical to the trainee's success as a call center agent. The recordings may be stored locally at the trainee terminal 130, for example, and accessed repeatedly to gauge progress.

Referring again to FIG. 3, when the business rules application 232 determines at step s340 that additional customer lines are pending, the business rule application 232 instructs the voice simulator to provide the next sequential customer portion of the conversation at step s342. As described above, the customer portion of the dialog segment is either a prerecorded voice or computer generated text-to-speech statement. Alternatively, the customer portion may be a textual statement.

The customer portion of the conversation initiates the next consecutive dialog segment of the scenario, necessitating an appropriate response from the trainee at step s324. Steps s324 through s344, as described above, are then repeated in relation to the next dialog segment. In particular, the simulator module 230 receives the trainee's response through the voice recognizer at step s324. The coach application 234 then identifies keywords at step s326, determines whether coaching is needed at step s330, provides feedback at step s332 (when required) and determines if repeating the dialog is necessary at step s334 (when required). The business rules application 232 then determines whether another customer interaction is to be played at step s340 and provides the next customer interaction at step s342, until the scenario is completed.

Returning to step s314, when the viewing scenarios option is not selected, the trainee may elect to activate the user statistics application 224 at step s350. When the user statistics application 224 is selected, the corresponding options are displayed at the trainee terminal 130 at step s352. Because the user statistics application 224 is also available to the trainers and managers, they may also be displayed at the trainer terminal 150 and the manager terminal 170.

The user statistics application 224 provides training simulation statistics at step s354, which may include the trainee's scored performances for the executed scenarios, in the context of the training requirements and goals, depending on the selection made from the displayed options at step s352. The data is standardized and may include additional information for the trainee to conduct an informed evaluation of his or her performance in comparison to other trainees in the trainee's group or throughout the company. The data displayed by the user statistics application 224 is similar in content to the data displayed, for example, in the exemplary web page 500 of FIG. 5, discussed above. However, the data is formatted to incorporate multiple scenarios and students.

The training program managers may customize the data presentation and emphasize particular areas of performance. For example, when the managers detect a trend toward excessive average time spent with callers, either through evaluation of the training program results or actual call center data, the user statistics application 224 may be modified to highlight the total time per call entry, and specifically note whether the time is too high. The user statistics application 224 may similarly be customized by trainers to focus the trainee (or group of trainees) on a particular area of importance or weakness.

The trainee may alternatively elect to enter the profile editor 226 at step s360. When the profile editor 226 is selected, the authorized functionality for the trainee is displayed at step s362, based on the authorized level of access pre-established by the registration system 244 and/or the user manager 246. The trainee's level of access is normally very limited. For example, the trainee may access the pre-approved scenarios and user statistics data, as well as change the trainee's password. In an embodiment of the invention, the profile editor 226 may be used to observe the various restrictions and privileges specific to the trainee, as determined through the registration system 244, discussed below.

Note that other user types are able to access and initiate changes to trainee authorized functionality by way of the profile editor 226. For example, a trainer is able to selectively block trainee access to learning units. When a user is able to perform edits, such as changing a password or altering authorized functionality, the changes are received by the profile editor 226 at step s364. The database 212 is updated accordingly at step s366.

The administration module 240 of the interactive training program enables trainers and managers to retrieve and analyze scenario, trainee, company and region-specific data, as well as to edit existing scenarios. Furthermore, the managers are able to control the operation, replication and distribution of the overall training program, as well as add and delete scenarios (e.g., the developers in particular). The administrator module 240 includes a scenario editor 242, a registration system 244, a user manager 246 and a reporter system 248. In an embodiment of the invention, the administrator module 240 may be a server application, for example, residing on a network server, such as the web sever 115. The user may initiate the administrator module 240 from the training module 220 by selecting the desired administrative function.

The scenario editor 242 provides a common interface enabling modifications and maintenance required for each training scenario. The scenario editor 242 may be a web-based, Java or JavaScript application that generally enables upper level users, such as trainers and managers, to read, edit and delete the scenarios implemented by the business rules application 232, including the dialog segments and the keywords. For example, existing objects may be edited and new objects may be created.

Interaction with the scenarios must follow an appropriate order. For example, the user must first select a scenario before being able to view or edit a particular dialog within the scenario. Similarly, the user must first select the dialog before being able to view or edit the keywords associated with that dialog. The customer data and the software emulation 238, which enable aspects of the training program, may also be viewed and edited by way of the scenario editor 242.

Also, the developers may add entirely new scenarios by way of the scenario editor 242. In an embodiment of the invention, the developer logs onto the training program system from the manager terminal 170, which receives XML, web pages via the intranet 120 from the web server 115. The web pages include fields for the customer lines of multiple dialog segments. The developer types the desired customer line and further provides the associated keywords that need to be in the trainee's response. Alternatively, the developer may reference voice files, prerecorded and stored or produced on-line by the developer, for each of the desired customer lines in a dialog segment. The data for the new scenario is then stored in the database 212 as text. However, in an embodiment of the invention, the customer lines are converted to speech (unless they are already recorded speech) and also stored as audio files in .WAV or MP3 format, for example.

In an embodiment of the invention, the scenario editor 242 likewise enables the trainers and managers to edit, read and delete the content of the coaching application 234. The editing functionality includes changing the substantive content of the hints, tips and learning units administered via the coach application 234.

The registration system 244 tracks and manages the registration status of trainees to the various scenarios. The functionality of the registration system 244 enables registering and un-registering trainees for scenarios, as well as allowing and listing all registered and practice scenarios for each trainee. The trainee may be able to observe his or her registration status through the profile editor 226, discussed above.

As shown in the exemplary web page 600 of FIG. 6, the registration system 244 may display the registration status of the trainees with respect to the available scenarios. In the depicted embodiment of the invention, all of the scenarios are listed in the scenario display 608 as headers 610 through 613. The web page is configured to scroll horizontally to show the additional scenarios, if needed. The individual trainees are listed in the associate column 620.

Each trainee is specifically designated as registered or not registered for each scenario. In an embodiment of the invention, a scenario may be designated "all" or "none" with respect to each registration, which relieves the trainer or manager from having to individually indicate every trainee with respect to particular scenarios. There is also an indication of whether practice scenarios are permitted for each scenario. For example, in row 621, representing Jane User, blocks 622 and 623, respectively, indicate that she is registered for the first scenario with no practice allowed, which means that the results of Jane User's performance of the first scenario will be scored and stored in the database 212. In the row 624, representing Kelly User, blocks 625 and 626, respectively, indicate that she is registered for the first scenario for purposes of practicing the scenario. In other words, Kelly User's results will not be stored. A trainee may not be registered for the same scenario more than once. This provides control over the integrity of the training process and is especially important for accurately comparing performance among multiple trainees or groups of trainees.

The registration system 244 may also be used to customize the nature of each trainee's interaction with the training program, including setting the level of coaching, the level of software emulation and the ability to navigate among dialog segments in scenarios. Exemplary web page 700 of FIG. 7 contains an exemplary individual trainee registration table. Entry 710 of the registration table 700 is the mandatory keyword intervention level, which indicates the percentage of mandatory keywords the trainee must miss before the coach application 234 intervenes to provide assistance in the form of hints, tips and learning units, as discussed above. Entry 712 indicates that the mandatory intervention level is set at 50, which means that coaching intervention begins when the matched keyword count is less than or equal to 50 percent. When entry 712 is set at 100, coaching intervention begins when the matched keyword count is less than or equal to 100 percent. When entry 712 is set at zero, there is not coaching intervention regardless of keyword matches.

As discussed above, alternative embodiments of the invention include additional types of keywords that the training program will track and score. For example, entries 714 and 718 are the optional keyword and forbidden keyword intervention levels, respectively. The optional keyword intervention level 714 is the percentage of optional keywords the trainee must match before receiving coaching related to the use of optional key words. Note that the optional keywords are recognized as being similar to the corresponding mandatory keywords, indicating the trainee's basic understanding of the scenario requirements, but are otherwise not acceptable for purposes of passing the scenario. The forbidden keyword intervention level 718 is the percentage of forbidden keywords the trainee must use before receiving coaching related to the use of forbidden key words. Both entries 716 and 720 indicate that the optional keyword intervention level and the forbidden keyword intervention level have been set at zero, meaning that the trainee will receive the corresponding coaching whenever an optional keyword or a forbidden keyword is used.

Entries 722 and 726 relate to whether software emulation 238 is to be explained and activated, respectively. Entry 724 indicates by the checkmark that intervention explaining call center software specific interactions is available to the trainee upon request. Entry 728 indicates that the software emulation 238 is turned ON for the trainee. When the software emulation 238 is OFF, the trainee is presented the scenario on a generic software application, which operates at a simplistic level with very limited service and customer data options.

Entry 730 enables coaching to be turned OFF entirely. For example, the trainer may want to test an advanced trainee, without access to coaching, to get an accurate demonstration of the trainee's unassisted performance. Entry 732 indicates that the coaching application 234 has been enabled for the trainee. Entry 734 enables navigation by the trainee within the scenario. Again, the trainer may want to eliminate the trainee's ability to move to repeat dialog segments to observe a uninterrupted scenario performance. Entry 736 indicates that the trainee is able to navigate, if desired. The registration setting are stored in conjunction with the trainee's scores for the registered scenarios. The various settings will be reflected in the reports generated by the reporter system 248, discussed below.

The user manager 246 of the administration module 240 enables users with administrative privileges to perform administrative functions through a common interface. For example, by way of the user manager 246, a manager is able to add new user records, edit user information, remove user records and read user information. Moreover, the manager may assign multiple levels of permissive access to the training program, individually or by category. For example, the manager determines the level of access available to all trainers.

In an embodiment of the invention, the various levels available to each user are as follows: Trainees (level 1) are able to take training simulations for scores, view their statistical information and performance results and change their passwords. The trainees possess no administrative rights and cannot change substantive data, including scenario registration, coaching intervention levels and the like. Trainers (level 2) are able to assign training scenarios to trainees, practice training simulations and access the scenario editor 242, the registration system 244 and the reporter system 248. The administrators (level 3) are able to access to the scenario editor 242 and the user manager 246, but cannot view reports from the reporter system 248 or assign training scenarios. The developers (level 4) are able to access all systems, as well as create new scenarios and coaching applications.

The reporter system 248 provides access to a trainee's simulation results generated by the simulator module 230 and stored in the database 212, and executes statistical analyses on that data. The reporter system 248 enables a trainee to review his or her performance on a particular simulation, review his or her performance on all simulations over time and view aggregate performances of trainee groups to compare and contrast the trainee's progress. For example, in an embodiment of the invention, the trainee is able to view percentile, rankings for the trainee's statistics for a particular simulation, view aggregate statistics for all users on selected scenario, view aggregate statistics for the trainee's team or group, view the trainee's statistics on all simulations over time, view the team's statistics on one scenario over time, view the team's statistics on all simulations over time and view and edit notes attached to particular simulation results.

The reporter system 248 includes various result records, such as the scenario result records, the dialog result records and the iteration result records. The scenario result records include the result of a single trainee taking a single scenario on a particular occasion. Multiple scenario result records exist when a trainee takes a particular scenario multiple times. The scenario result record contains data about the trainee's performance relative to the entire scenario, including the date the scenario was taken, notes amended by the trainer, the trainee's overall statistics, and the amount of time spent in the scenario. The dialog result record is a component of a scenario result record and stores information about a trainee's performance on a particular dialog segment of a scenario. The iteration result record is a component of a dialog result record and includes performance information about a particular iteration of a dialog segment of a scenario for a trainee.

The reporter system 248 is flexibly integrated with the various dynamic aspects of the training program to assure proper context and accuracy of the reports. For example, the level of coaching can be adjusted by the trainer on an individual trainee basis; as discussed with respect to FIG. 7 above. In other words, two trainees participating in the same scenario may have different levels of coaching. It is therefore possible that a more advanced trainee, who has little to no coaching, performs the same as an inferior trainee, who has the highest level of coaching. The dynamic nature of the reporter system 248 factors in that the score of the more advanced trainee was obtained without the full benefit of coaching and reports accordingly. The reporter system 248 therefore provides an accurate picture of the training results customized to the trainee's individual training experience.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTTP) represent examples of the state of the art. Such standards are periodically superseded by faster or more efficient equivalents having essentially the same functions. Accordingly, replacement standards and protocols having the same functions are considered equivalents.

What is claimed:

1. An interactive training method based on a simulated customer interaction, the method comprising:
    providing a predetermined customer portion of a dialog segment from the simulated customer interaction to a trainee via a graphical user interface, the dialog segment comprising the customer portion and at least one predetermined keyword associated with the customer portion;
    receiving a response to the customer portion from the trainee via the graphical user interface; and
    determining whether the response includes the at least one keyword.

2. The interactive training method according to claim 1, further comprising:
    providing a second predetermined customer portion of the dialog segment to the trainee via the graphical user interface, the dialog segment further comprising a second predetermined keyword associated with the second customer portion;
    receiving a second response to the second customer portion from the trainee via the graphical user interface; and
    determining whether the second response includes the second keyword.

3. The interactive training method according to claim 1, in which providing the predetermined customer portion comprises playing at least a portion of an audio file at the graphical user interface.

4. The interactive training method according to claim 3, in which receiving the response to the customer portion comprises receiving and recording a verbal response from the trainee.

5. The interactive training method according to claim 1, further comprising:
    recording the response as an audio file; and
    playing the audio file in response to a request received from the graphical user interface.

6. The interactive training method according to claim 1, further comprising:
    providing instruction to the trainee via the graphical user interface based on at least the response to the customer portion.

7. The interactive training method according to claim 6, further comprising:
   determining a level of instruction to provide to the trainee prior to providing the instruction, the level of instruction being based on at least a determination of performance by the trainee.

8. A computer readable medium for storing a computer program for interactive training based on a simulated customer interaction, the computer readable medium comprising:
   a dialog code segment that provides a predetermined customer portion of a dialog segment from the simulated customer interaction to a trainee, the dialog segment comprising the customer portion and at least one predetermined keyword associated with the customer portion;
   a response code segment that receives a response to the customer portion from the trainee; and
   a determining code segment that determines whether the response includes the at least one keyword.

9. The computer readable medium according to claim 8, in which:
   the dialog code segment provides a second predetermined customer portion of the dialog segment to the trainee, the dialog segment further comprising a second predetermined keyword associated with the second customer portion;
   the response code segment receives a second response to the second customer portion from the trainee; and
   the determining code segment determines whether the second response includes the second keyword.

10. The computer readable medium according to claim 8, further comprising:
    a display code segment that displays a summary of performance of the trainee with respect to the simulated customer interaction.

11. The computer readable medium according to claim 8, in which the dialog code segment provides the predetermined customer portion by playing at least a portion of an audio file.

12. The computer readable medium according to claim 11, in which the response code segment receives the response to the customer portion by receiving and storing a verbal response from the trainee.

13. The computer readable medium according to claim 8, further comprising:
    a recording code segment that records the response as an audio file; and
    a playback code segment that plays the audio file in response to a request.

14. The computer readable medium according to claim 8, further comprising:
    a coaching code segment that provides instruction to the trainee based on at least the response to the customer portion.

15. The interactive training method according to claim 14, in which the coaching code segment comprises a determining code segment that determines a level of instruction to provide to the trainee prior to providing the instruction, the level of instruction being based on at least a determination of performance by the trainee.

16. A computer readable medium for storing a computer program that provides interactive training, the computer readable medium comprising:
    a retrieving code segment that retrieves a previously stored, simulated customer interaction from a database, the simulated customer interaction comprising a plurality of dialog segments, each dialog segment comprising a customer portion and at least one keyword corresponding to the customer portion;
    an executing code segment that executes the plurality of dialog segments by providing the customer portion of each dialog segment to the trainee via a trainee terminal and receiving a corresponding trainee response; and
    a determining code segment that determines whether each trainee response includes the at least one keyword corresponding to the customer portion of each dialog segment.

17. The computer readable medium according to claim 16, further comprising:
    a coaching code segment that provides a predetermined level of instruction to the trainee when the determining code segment identifies an incorrect trainee response of at least one dialog segment that does not include the at least one keyword corresponding to the customer portion of the dialog segment.

18. The computer readable medium according to claim 17, in which the coaching code segment further comprises a determining code segment that determines a level of instruction based on at least a number of times the trainee performed the simulated customer interaction.

19. The computer readable medium according to claim 16, further comprising:
    a display code segment that displays a summary of the trainee's performance with respect to the simulated customer interaction at the trainee terminal, the summary comprising a number of trainee responses associated with the plurality of dialog segments that included the at least one keyword corresponding to each dialog segment.

20. The computer readable medium according to claim 16, further comprising:
    an editing code segment that receives a change to a selected dialog segment of the plurality of dialog segments, the change comprising at least one of adding or deleting the at least one keyword.

* * * * *